July 20, 1965  T. S. GATES ETAL  3,195,409
TOOL AND TOOL SLIDE DRIVING MEANS IN GEAR FINISHING MACHINES
Filed April 12, 1962  5 Sheets-Sheet 1

INVENTORS
THOMAS S. GATES
KENNETH J. DAVIS
BY ARTHUR B. BASSOFF
Whittemore Hulbert
& Belknap ATTORNEYS

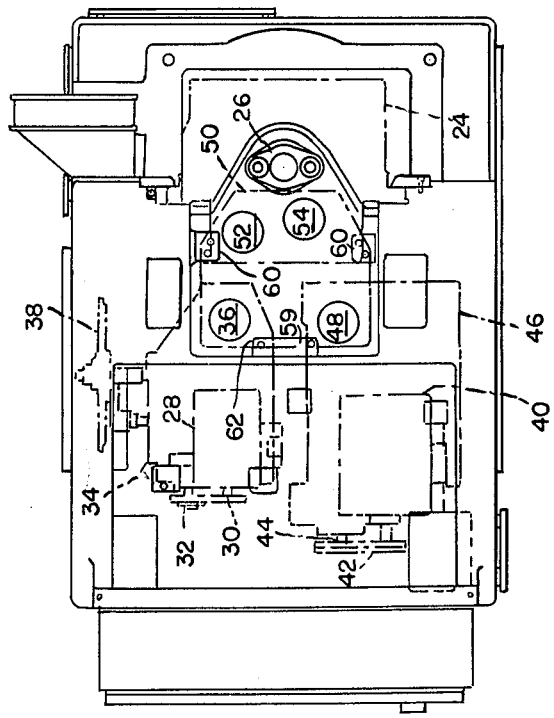

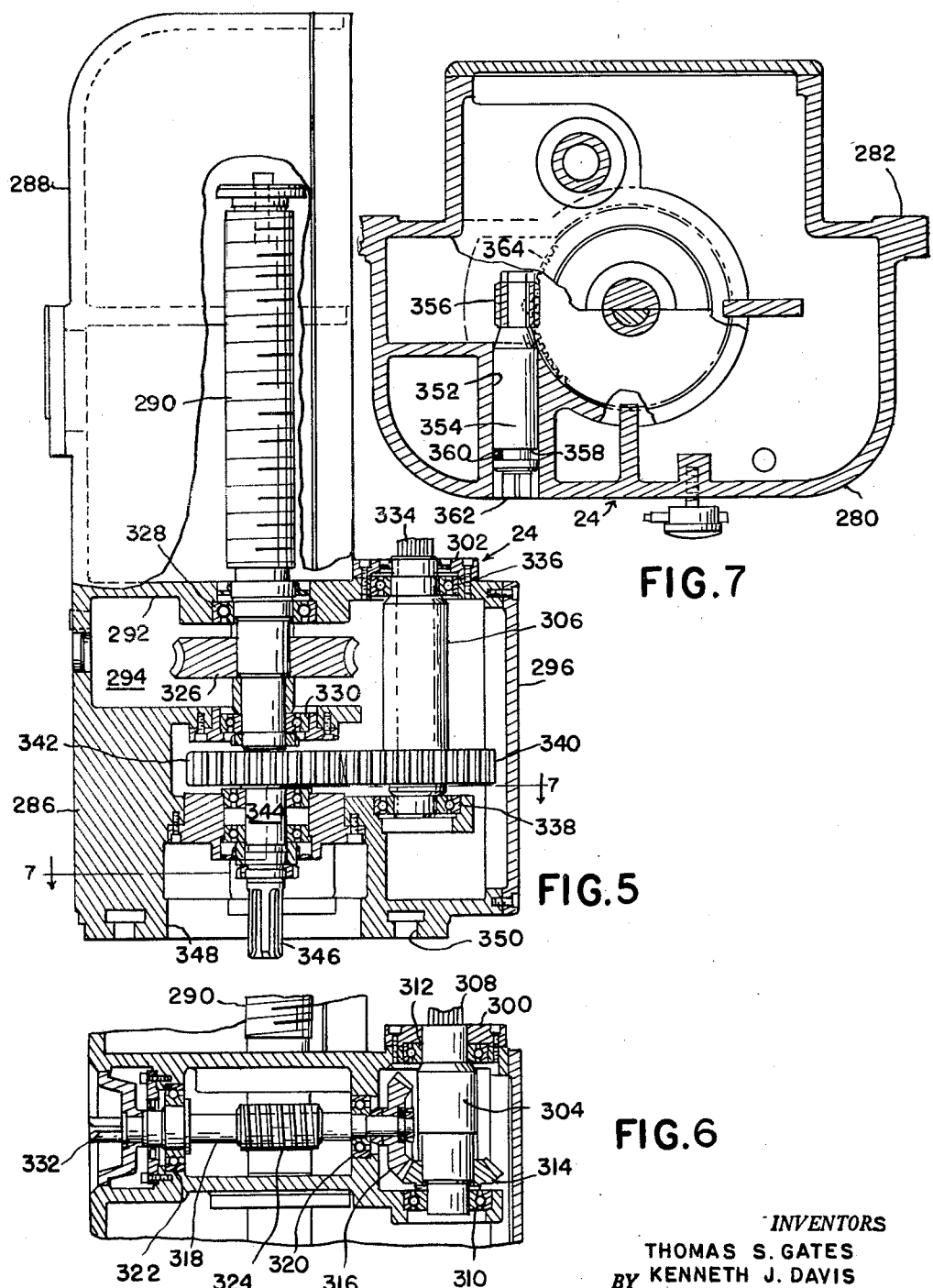

July 20, 1965  T. S. GATES ETAL  3,195,409
TOOL AND TOOL SLIDE DRIVING MEANS IN GEAR FINISHING MACHINES
Filed April 12, 1962  5 Sheets-Sheet 4
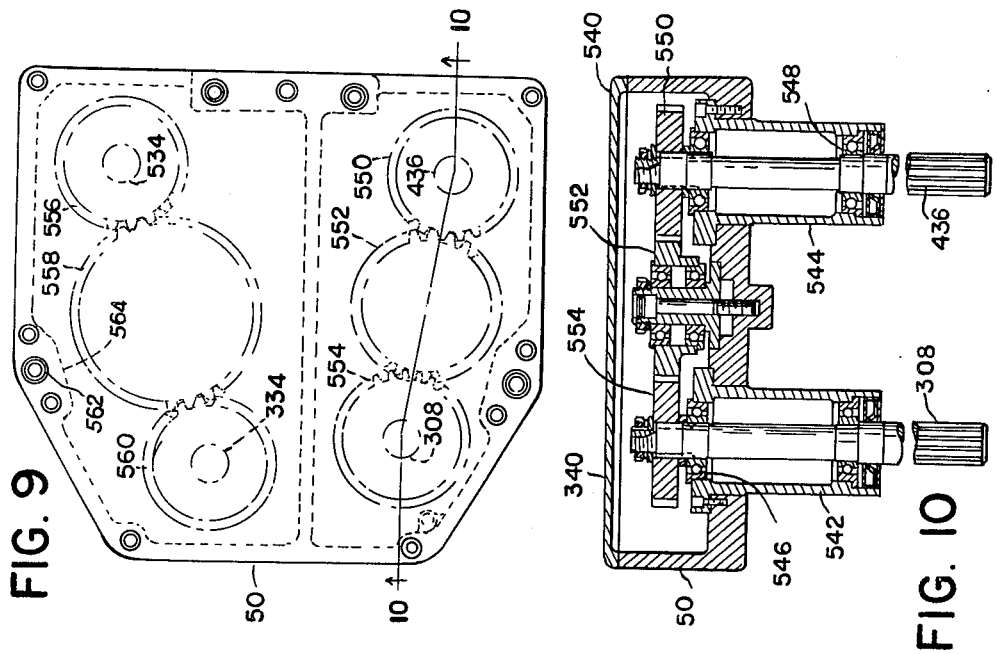
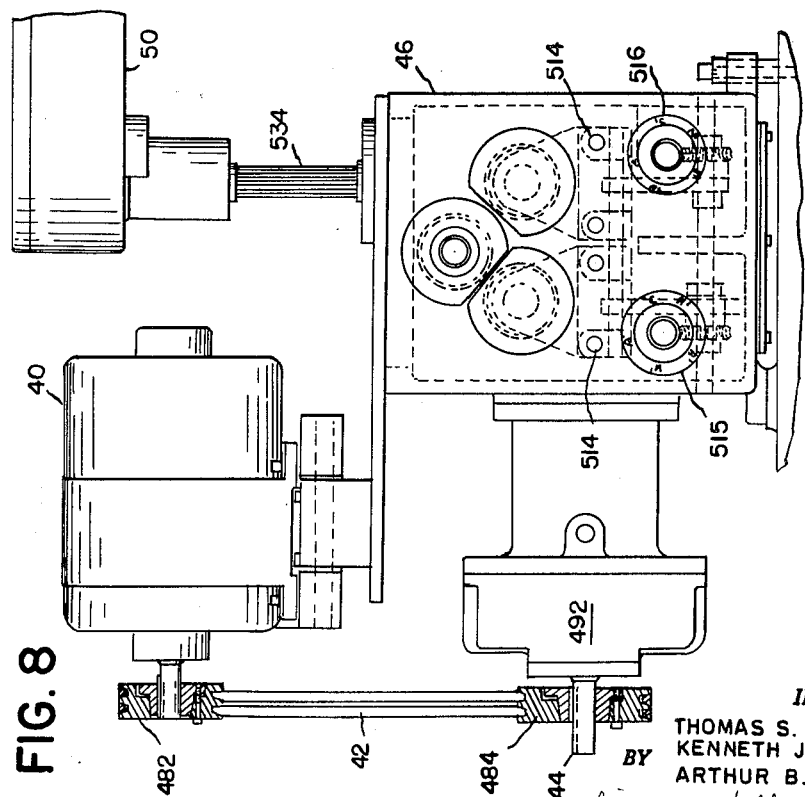
INVENTORS
THOMAS S. GATES
KENNETH J. DAVIS
ARTHUR B. BASSOFF
BY Whittemore, Hulbert & Belknap
ATTORNEYS

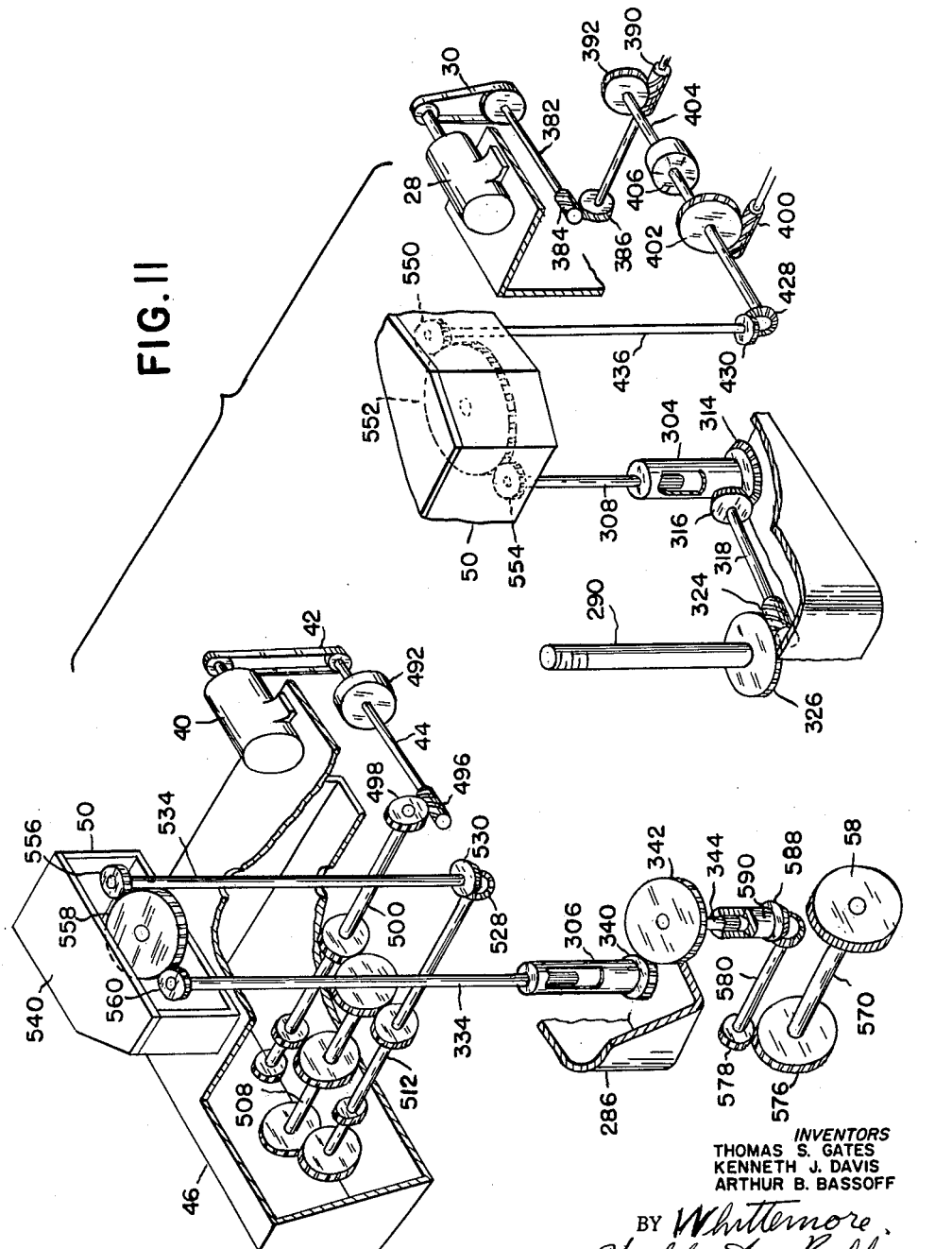

United States Patent Office 3,195,409
Patented July 20, 1965

3,195,409
TOOL AND TOOL SIDE DRIVING MEANS IN GEAR FINISHING MACHINES
Thomas S. Gates, Grosse Pointe Woods, and Kenneth J. Davis and Arthur B. Bassoff, Detroit, Mich., assignors to National Broach & Machine Company, Detroit, Mich., a corporation of Michigan
Filed Apr. 12, 1962, Ser. No. 186,994
13 Claims. (Cl. 90—1.6)

The present invention relates to a gear finishing machine of the type in which a work gear is rotated in mesh with a gear-like tool with the axes of the gear and tool crossed.

It is an object of the present invention to provide a gear finishing machine including a horizontal base, a vertical column at one side of the base, a work supporting slide movable horizontally on the base, a cutter head slide movable vertically on the column, motors in said column for effecting vertical movement of said cutter and said slide and rotation of a cutter carried by said cutter head slide.

It is a further object of the present invention to provide a machine as described in the preceding paragraph in which said cutter head slide includes a vertical feed screw, and a fixed nut carried by said column and engaged by said feed screw.

It is a further object of the present invention to provide in a gear finishing machine, a tool column, a cutter head slide mounted on said column for vertical adjustment, a cutter head suspended at the underside of said cutter head slide for angular adjustment about a vertical axis, a cutter feed motor and a cutter drive motor in said column, a separate transmission associated with each of said motors, each of said transmissions including a vertical upwardly extending spline shaft, a transfer box fixedly mounted in said column having a pair of downwardly extending spline shafts, gearing in said transfer box interconnecting each of said downwardly extending spline shafts with one of the spline shafts connected to the transmissions associated with the cutter feed and cutter drive motors.

It is a further object of the present invention to provide in a gear finishing machine means for effecting automatic incremental relative radial feed between the gear and tool comprising a motor, an electrically actuated brake associated with said motor, and adjustable switch means for starting said motor and for stopping said motor after a predetermined incremental feed.

Other objects and features of the invention will become apparent as the description proceeds, especially when taken in conjunction with the accompanying drawings, illustrating preferred embodiments of the invention, wherein:

FIGURE 3 is a plan view of the base and column assembly.

FIGURE 4 is a bottom plan view of the cutter head slide assembly.

FIGURE 5 is a side view of the cutter head slide assembly, partly in section, on the line 5—5, FIGURE 4.

FIGURE 6 is a sectional view on the line 6—6, FIGURE 4.

FIGURE 7 is a sectional view on the line 7—7, FIGURE 5.

FIGURE 8 is a side elevation of the cutter head drive assembly.

FIGURE 9 is a plan view of the transfer gear box.

FIGURE 10 is a sectional view on the line 10—10, FIGURE 9.

FIGURE 11 is an exploded more or less diagrammatic view showing the transfer box and associated mechanism.

Figures 1, 2:
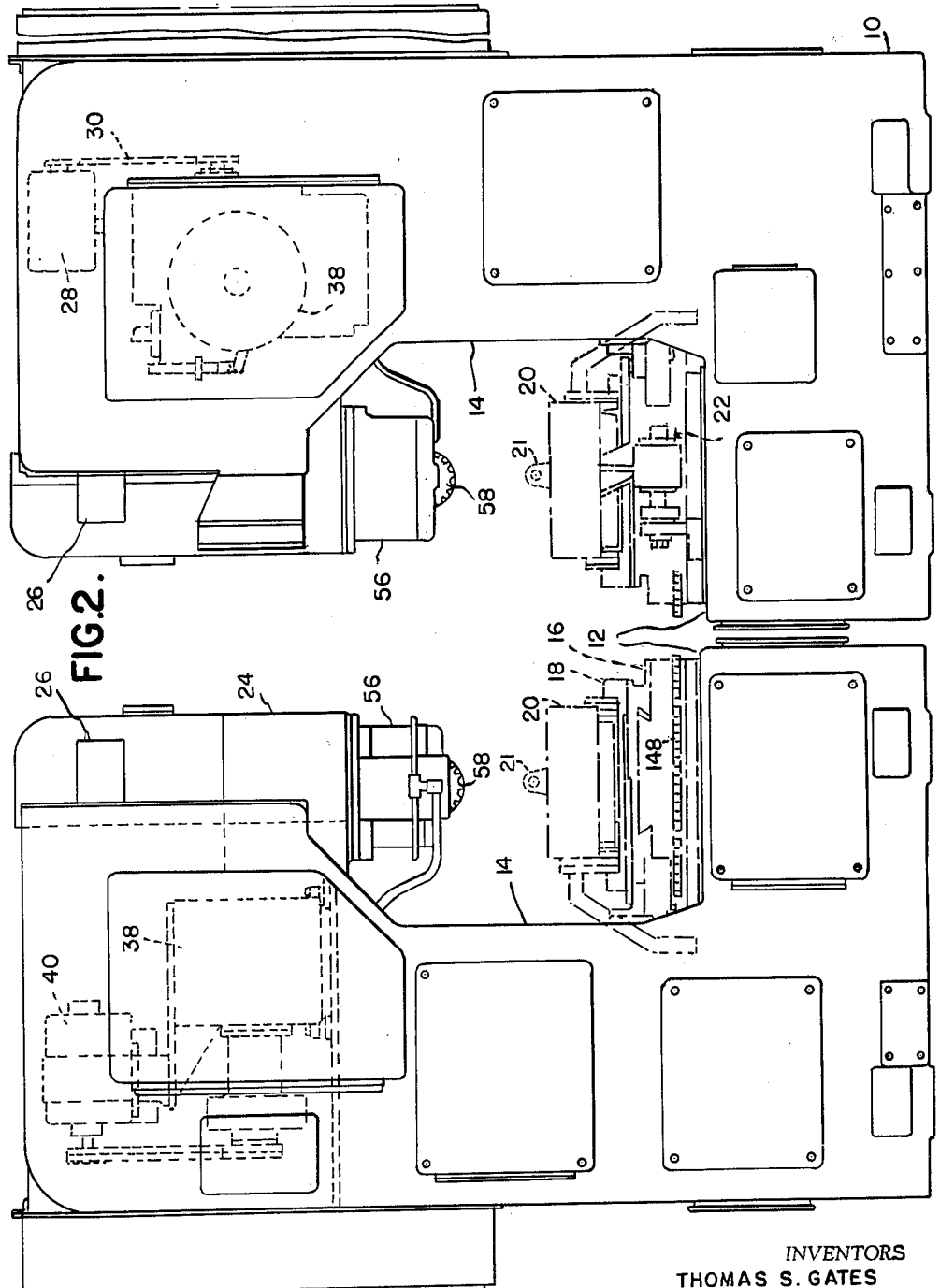
FIGURE 1 is a right side elevation of the base and column assembly.
FIGURE 2 is a left side elevation of the base and column assembly.

The machine comprises a main frame including a base on which is mounted a sandwich comprising upper and lower parts interconnected by horizontal rectilinear ways. The sandwich as a whole is adjustable about a vertical axis to cause the ways to extend in any desired direction in a horizontal plane. Connected to the upper horizontally movable part of the sandwich by a swivel connection providing for adjustment of the sandwich is a work support table to which is pivoted a crowning table, the crowning table being adapted to rock about a horizontal pivot axis perpendicular to the axis of a work gear carried thereby.

Means for mounting a work piece for rotation is provided on the crowning table and comprises head and tailstocks establishng an axis of rotation which extends horizontally in parallelism with the ways when the sandwich is in intermediate position.

Within the base is a motor and a transmission including change gearing provided with gear shift mechanism for effecting horizontal reciprocation of the upper portion of the sandwich relative to the lower portion.

The machine frame includes a vertical column and movable vertically at one side of the column is a cutter head slide assembly. Suspended at the underside of the cutter head slide assembly is a cutter head which is angularly adjustable to determine the crossed axes relationship between the work gear and gear-like cutter. Means are provided for effecting vertical movement of the cutter head slide assembly and for effecting rotation of a gear-like cutter carried by the cutter head. This mechanism comprises a cutter feed motor and a cutter drive motor within the column, each of which includes a separate transmission housed within separate housings, each terminating in a single vertically extending output spline connection, a transfer box fixedly mounted adjacent the top of the column and extending over the cutter feed housing and cutter drive housing and including means cooperating with the spline connection to receive the spline shafts thereof. The transfer box extends forwardly and has output spline shafts one of which is associated with mechanism for rotating a vertical feed screw carried by the cutter head slide assembly to effect vertical adjustment of the cutter head slide assembly. The other output spline shaft is connected to cutter head drive mechanism for driving a cutter spindle in rotation in any position of angular adjustment of the cutter head and to any position of vertical adjustment of the cutter head slide assembly.

With the foregoing general description in mind, attention is now directed to the drawings.

*Base and column assembly*

The base and column assembly of the machine is illustrated in FIGURES 1–3, and in these figures the locations of components other than the frame elements are indicated generally in outline by dot and dash lines.

The machine comprises a main frame 10 including a base portion 12 and a vertically upwardly extending column 14. Mounted on the base 12 for angular adjustment about a vertical axis is a two-element sandwich 16. A work table 18 is connected to the upper element of the sandwich 16 for horizontal reciprocation therewith as the upper sandwich element is reciprocated. The connection between the work table 18 and upper sandwich element is a pivot means having a vertical axis to permit angular adjustment of the sandwich as a unit while the work table maintains its orientation. In order to maintain orientation of the work table 18 as the sandwich is adjusted angularly, linkage interconnects the work table 18 and the sandwich.

A crowning table 20 is connected to the work table 18 for rocking movement relative thereto about a horizontal axis. The crowning table 20 carries head and tailstocks indicated diagrammatically at 21 for supporting a work gear for rotation and the pivot axis of the crowning table is located below and extends perpendicularly to the axis of the work piece as established by the work supporting centers.

Cam means indicated generally at 22 are provided which extend between and interconnect the crowning table 20 and the base 12.

Mounted at the forward side of the column 14 is a cutter head slide assembly 24 which is vertically movable thereon. The vertical adjustment of the cutter head slide assembly is by means of an upwardly extending feed screw rotatably carried by the cutter head slide assembly and associated with a fixed feed nut indicated generally at 26 in FIGURE 3. In order to accomplish vertical movement of the cutter head slide assembly there is provided within the column a cutter feed motor 28 connected by a belt 30 to a sheave 32 carried by a shaft extending into the interior of a vertical feed housing 34. The vertical feed housing 34 will be described in detail but it includes rotary output means including a spline shaft at the location designated 36 in FIGURE 3. Driven by mechanism associated with the vertical feed is an incremental feed dial 38 which includes adjustable switch actuating means for determining the incremental infeed and return of the cutter to a position separated from the work piece.

Also provided in the hollow interior of the column 14 is a cutter drive motor 40 connected by a double pulley 42 to a sheave carried by a shaft 44 extending to the interior of the cutter head drive and change gear housing 46. The housing 46 includes a power output including a vertical spline shaft at the location designated 48 in FIGURE 3.

Located partly within the hollow interior of the column 14 adjacent its upper end and extending forwardly therefrom is a transfer box 50 having openings in the underside thereof for the reception of a pair of spline input shafts and a pair of spline output shafts. The opening for the reception of one of the spline input shafts is at the location designated 36 in FIGURE 3, which is of course in alignment with the spline shaft extending upwardly from the cutter feed motor. The opening in the transfer box for the reception of the other input spline shaft is at the location 48, as seen in FIGURE 3, which is in alignment with the spline shaft extending upwardly from the cutter drive housing 46. Suitable gearing within the transfer box connects the input spline shafts with output spline shafts which extend vertically downwardly from the transfer box at the locations 52 and 54, as seen in FIGURE 3. At the location 52 there is provided a downwardly extending spline shaft which is associated with the cutter head slide assembly, as will subsequently be described, and is adapted through suitable mechanism to effect rotation of the vertical feed screw extending upwardly from the cutter head slide assembly and in threaded engagement with the nut 26.

The downwardly extending output spline shaft carried by the transfer box 50 at the location designated 54 extends into the cutter head slide assembly in which is included mechanism for connecting the spline shaft to a tool spindle rotatably carried in the cutter head 56. A portion of the cutter is seen at 58.

Within the column 14 are inwardly extending bosses 59 and 60 upon which the transfer box 50 is supported.

*Cutter head slide assembly*

The cutter head slide assembly indicated generally at 24 is illustrated in FIGURES 4–7. The main casting 280 of the cutter head slide assembly includes laterally extending flanges 282 by means of which the cutter head slide is mounted to the front face of the frame column 14 by gibs.

The cutter head slide assembly includes a lower body portion 286 and an upwardly extending hollow cover or hood portion 288 which overlies the vertically extending feed screw 290. The lower portion 286 of the cutter head slide assembly includes a horizontal partition 292 defining a gear housing space 294 closed at the rear by a removable cover plate 29. Within the gear housing are provided separate transmission means one of which is connected to drive the cutter slide feed screw 290 and the other of which is included in the transmission for driving the cutter spindle in rotation. The cutter head slide assembly includes a rearwardly extending portion 298 terminating at its upper side in openings receiving bearing mounting plates 300 and 302. The bearing mounting plate 300 supports a bearing which in turn mounts a splined coupling 304 which is a part of the cutter slide feed screw drive. The plate 302 supports a bearing which in turn mounts a splined coupling 306 which is a part of the cutter spindle drive transmission.

The cutter head slide assembly moves vertically both during a machining cycle to accomplish infeed between the gear and cutter, and also is movable a substantial distance between machining cycles to facilitate loading. In order to transmit the required power drive to the cutter head feed screw 290 and to the cutter supporting spindle later to be described, as the cutter slide moves vertically, spline connections are provided. This permits the separate cutter feed motor 28 and the cutter drive motor 40 to be mounted in fixed positions within the column and at the same time, to transmit power to the cutter head feed screw 290 and the cutter spindle.

Referring first to FIGURES 4 and 6, the mechanism for transmitting rotation to the feed screw 290 will be described. A spline shaft 308 is provided which extends downwardly from the transfer box 50. The mechanism for driving the spline shaft 308 and for selecting its speed will be described subsequently in detail. For the present however, it is only necessary to note that the spline shaft 308 is driven in rotation at a speed appropriate to produce the appropriate speed of rotation of a feed screw which moves the cutter head slide. The internally splined coupling 304 is mounted in bearings 310 and 312 and receives the spline shaft 308 in slidable relation therein. Adjacent its lower end the coupling 304 has secured thereto a bevel gear 314 which meshes with a second bevel gear 316 carried by a shaft 318 mounted for rotation on bearings 320 and 322. The shaft 318 carries a worm 324 which meshes with a worm gear 326 fixed to the lower end of the cutter head feed screw 290. The feed screw 290 is mounted in bearings 328 and 330 which prevent relative longitudinal movement between the feed screw 290 and the cutter head slide 24 so that upon rotation of the feed screw 290, which is threadedly received in the feed nut 26 carried at the upper end of the column 14, vertical movement of the cutter head slide assembly results.

It will further be observed that the shaft 318 which carries the worm 324 extends outwardly and has its outer end squared as indicated at 332 for engagement by a hand tool. This permits manual vertical adjustment of the cutter head slide without the assistance of its actuating motor.

Referring now to FIGURES 4 and 5 there is illustrated the mechanism which constitutes a portion of the transmission to the cutter spindle. As best seen in FIGURE 5, there is provided a spline shaft 334 which also extends downwardly from the transfer box 50. The lower end of the spline shaft 334 extends within the splined coupling 306 which is mounted for rotation in bearings 336 and 338. At the lower end of the splined coupling 306 there is affixed a gear 340 which meshes with a gear 342 carried at the upper end of the shaft 344, the lower end of which is splined as indicated at 346.

The lower end of the cutter head slide assembly includes a cylindrical piloting recess 348 and located outwardly of the recess is an arcuate T-slot 350 which may be continuous or formed in sections. The recess 348 is for receiving and piloting the upper pilot portion of the cutter head 56, which will subsequently be described in detail.

Located adjacent the lower end of the cutter head slide assembly 24 is a cylindrical opening 352 and retained in this opening against axial movement is a shaft 354 carrying a worm 356 at its inner end. The shaft 354 is provided with an annular groove 358 which receives a pin 360, the pin preventing axial movement of the shaft while permitting free rotation thereof. The outer end of the shaft 354 is squared as indicated at 362, for the reception of a tool. The worm 356 is adapted to mesh with worm gear teeth 364 formed at the upper end of the pilot portion of the cutter head, later to be described. By loosening T-bolts received in the T-slot 350, rotation of the worm 356 will provide for angular adjustment of the cutter head, after which it may be clamped in adjusted position.

Cutter head drive assembly

Referring now to FIGURE 8 there is illustrated the motor 40 carried by the cutter head drive and change gear housing 46. The motor includes a driving sheave 482 driving the double belt 42 which in turn drives the sheave 484 connected to the shaft 44. Associated with the shaft 44 is an electromagnetic brake 492. The brake 492 is a purchased item and is of the type urged into braking position by suitable means such for example as a spring and adapted to be retained in release position when energized. The brake is connected in the circuit so that when the motor 40 is energized the brake 492 is also energized and is in release condition. However, when the circuit to the motor 40 is broken, so also is the circuit to the brake, which brings the shaft 40 to an abrupt stop upon termination of drive by the motor 46. This is important because operation of the appropriate switch to terminate infeed desirably causes abrupt and substantially instantaneous termination of cutter rotation.

Means are provided for selecting the ratio of change gearing contained within the housing 46. Essentially, the drive is from the shaft 44 through suitable change gearing mounted in part on rails 514 and shiftable to change the ratio by knocks 515 and 516.

The change gearing drives a splined coupling receiving the splined drive shaft 534.

Transfer box

The transfer gear box 50 is illustrated in FIGURES 30-32A. The transfer gear box includes a removable cover 540 and at its underside is provided with four bearing sleeves, two of which are indicated at 542 and 544. These bearing sleeves at their upper ends are provided with bearings 546, and at their lower ends with bearings 548, and support the upper ends of the spline shafts 308, 334, 436 and 534, all previously described. As best seen in FIGURE 32, there is illustrated the spline shafts 308 and 436. The spline shaft 436 as will be recalled, is connected by a splined coupling to gearing within the vertical feed housing 34. The spline shaft 308 extends downwardly from the transfer box 50 into a splined coupling at the upper end of the cutter head slide assembly 24. Within the transfer box 50 the shafts 308 and 436 are interconnected by gears 550, an idle gear 552, and a gear 554. It will be understood that similarly, the input spline shaft 534 is connected to the output spline shaft 334 by gears indicated at 556, 558 and 560. The shaft 534 extends upwardly into the transfer box 50 from the cutter head drive and change gear housing 46 and the spline shaft 334 extends downwardly from the transfer box 50 and enters a splined coupling at the upper side of the cutter head slide assembly.

The transfer box 50, as previously described, is rigidly bolted to inwardly projecting lugs provided at the inner side of the hollow frame column 14, and for this purpose is provided with through openings 562 extending through downwardly projecting integral mounting lugs 564.

The drawings and the foregoing specification constitute a description of the improved gear finishing machine in such full, clear, concise and exact terms as to enable any person skilled in the art to practice the invention, the scope of which is indicated by the appended claims.

What we claim as our inventions is:

1. In a gear finishing machine comprising a horizontal base and a first rotary support having a horizontal axis of a rotation movable horizontally on said base, a vertical column at the side of said base, a slide mounted on said column for vertical movement thereon, a second rotary support of said slide having a horizontal axis of rotation and located directly above said first rotary support, feed screw and nut mechanism connected between said slide and column, a feed motor mounted in a fixed position in said column, transmission means connecting said feed motor to said screw and nut mechanism, said transmission means including vertically extending relatively slidable spline shaft and spline coupling members, one of which is carried by said slide.

2. In a gear finishing machine comprising a horizontal base and a first rotary support having a horizontal axis of rotation movable horizontally on said base, a vertical column at the side of said base a slide mounted on said column for vertical movement thereon, a second rotary support on said slide having a horizontal axis of rotation and located directly above said first rotary support, feed screw and nut mechanism connected between said slide and column, a feed motor mounted on a fixed position in said column, first transmission means connecting said feed motor to said screw and nut mechanism, said first transmission means including vertically extending relatively slidable spline shaft and spline coupling members, one of which is carried by said slide, a drive motor mounted in a fixed position in said column, second transmission means connecting said drive motor to said second rotary support, said second transmission means including second vertically extending relatively slidable spline shaft and spline coupling members one of which is carried by said slide.

3. In a gear finishing machine comprising a horizontal base and a first rotary support having a horizontal axis of rotation movable horizontally on said base, a vertical column at the side of said base, a slide mounted on said column for vertical movement thereon, a second rotary support on said slide having a horizontal axis of rotation and located directly above said first rotary support, feed screw and nut mechanism connected between said slide and column, a feed motor mounted in a fixed position in said column, first transmission means connecting said feed motor to said screw and nut mechanism, said first transmission means including vertically extending relatively slidable spline shaft and spline coupling members, one of which is carried by said slide, a drive motor mounted in a fixed position in said column, second transmission means connecting said drive motor to said second rotary support, said second transmission means including second vertically extending relatively slidable spline shaft and spline coupling members one of which is carried by said slide, said first and second transmission means including a transfer box fixedly carried at the top of said column, input drive shafts extending into said box from said feed and drive motors, the first and second spline shafts and spline coupling members extending vertically between said transfer box and said slide.

4. In a gear finishing machine comprising a horizontal base and a first rotary support having a horizontal axis of rotation movable horizontally on said base, a vertical column at the side of said base, a slide mounted on said column for vertical movement thereon, a second rotary support on said slide having a horizontal axis of rotation and located directly above said first rotary support, feed screw and nut mechanism connected between said slide and said column, a feed actuating housing fixedly mounted in said column, a feed motor adjacent said housing, first transmission means including transmission gearing in said housing connected to said feed motor, said transmission means including a first spline shaft extending vertically above said slide and coupled to said feed screw and nut mechanism, a drive actuating housing fixedly mounted in said column, a drive motor adjacent said drive actuating housing, second transmission means including transmission gearing in said drive actuating housing connected to said drive motor, said second transmission means including a second spline shaft extending vertically above said slide and coupled to said second rotary support.

5. In a gear finishing machine comprising a horizontal base and a first rotary support having a horizontal axis of rotation movable horizontally on said base, a vertical column at the side of said base, a slide mounted on said column for vertical movement thereon, a second rotary support on said slide having a horizontal axis of rotation and located directly above said first rotary support, feed screw and nut mechanism connected between said slide and column, a feed actuating housing fixedly mounted in said column, a feed motor mounted adjacent said housing, first transmission means including transmission gearing in said housing connected to said motor, said transmission means including a first spline shaft extending vertically above said slide and coupled to said feed screw and nut mechanism, a drive actuating housing fixedly mounted in said column, a drive motor mounted adjacent said drive actuating housing, second transmission means including transmission gearing in said drive actuating housing connected to said drive motor, said second transmission means including a second spline shaft extending vertically above said slide and coupled to said second rotary support, a transfer box fixedly mounted in said column adjacent its upper end partly overlying said slide and said housings, said spline shafts extending downwardly from said box to said slide, drive shafts extending upwardly from said housings into said box, spline shafts extending downwardly from said box to said slide, means carried by said slide to couple said spline shafts to said screw and nut mechanism and to said rotary support, and gearing in said box connecting each of said drive shafts to one of said spline shafts.

6. In a gear finishing machine comprising a horizontal base and a first rotary support having a horizontal axis of rotation movable horizontally on said base, a vertical column at the side of said base, a slide mounted on said column for vertical movement thereon, a second rotary support on said slide having a horizontal axis of rotation and located directly above said first rotary support, feed screw and nut mechanism connected between said slide and column, a feed actuating housing fixedly mounted in said column, a feed motor mounted adjacent said housing, first transmission means including transmission gearing in said housing connected to said motor, said transmission means including a drive shaft extending vertically upward from said feed actuating housing, a spline shaft extending vertically upwardly from said slide and coupled thereat to said feed screw and nut mechanism, and gearing connecting said drive shaft and spline shaft, a drive actuating housing fixedly mounted in said column, a drive motor mounted adjacent said drive actuating housing, second transmission means including transmission gearing in said drive actuating housing connected to said motor, said second transmission means including a second drive shaft extending vertically upward from said drive actuating housing, a second spline shaft extending vertically upwardly from said slide and coupled thereat to said rotary support, and gearing connecting said second drive shaft and said second spline shaft.

7. In a gear finishing machine having a base, a first slide movable thereon in a horizontal plane and including a first rotary support whose axis of rotation occupies a horizontal plane, a vertical column at the side of said base, a second slide movable vertically on said column, a second rotary support on said second slide having its axis of rotation horizontal and angularly adjustable about a vertical axis, a stationary feed nut carried by said column above said second slide, a vertical feed screw coupled to said second slide and engaged in said nut, separate feed and drive motors in said column, transmission means coupling said motors respectively to said feed screw and to said second rotary support, said transmission means comprising a single transfer box carried by said column and having a portion overlying said second slide and a portion extending laterally beyond said second slide, said transmission means including drive shafts intermediate said transfer box and said motors and vertical splined shafts and shaft couplings intermediate said transfer box and said second slide, and gear means within said transfer box included in the transmission means between said motors and said vertical splined shafts and shaft couplings.

8. In a gear finishing machine comprising a horizontal base and a rotary work gear support having a horizontal axis of rotation and movable on said base in a horizontal plane, a vertical column at the side of said base, a tool slide movable vertically on the side of said column adjacent the base, a rotary tool spindle having its axis of rotation occupying a horizontal plane carried by said slide at the underside thereof, said tool spindle being adjustable relative to said slide about a vertical axis, a feed nut carried by said column, a rotatable vertical feed screw carried by said slide engaged in said nut, said column having a vertically elongated opening in the side thereof carrying said slide, said slide having a housing portion projecting through said opening into the interior of said column, a transfer box within said column having a portion overlying the housing portion of said slide, a first train of gearing in said slide including a first splined gear in said housing portion and connected to said feed screw, a second train of gearing in said slide including a second splined gear in said housing and connected to said tool spindle, splined drive shafts extending vertically from said transfer box to said splined gears, separate tool slide feed and tool spindle drive motors mounted in fixed position in said column, and drive means including transfer gearing in said transfer box connecting said motors respectively to said splined drive shafts.

9. A machine as defined in claim 8 which comprises a vertical feed housing having an input shaft connected to said tool slide feed motor and an output shaft connected to the transfer gearing in said transfer box, and change speed gearing in said vertical feed housing.

10. A machine as defined in claim 9 in which said vertical feed housing and the gearing therein is a separable assembly capable of insertion and removal as a complete unit relative to said column for connection therewith.

11. A machine as defined in claim 8 which comprises a cutter head drive housing having an input shaft connected to said tool spindle drive motor and an output shaft connected to the transfer gearing in said transfer box, and change speed gearing in said cutter head drive housing.

12. A machine as defined in claim 11 in which said cutter head drive housing and the gearing therein is a separable assembly capable of insertion and removal as a complete unit relative to said column for connection therewith.

13. A gear finishing machine comprising a column, a tool slide movable vertically on said column, a tool spindle carried by said tool slide for angular adjustment about an axis perpendicular to and intersecting the axis of said spindle, a transfer box fixedly mounted in said column having slide feed and tool spindle drive transfer gearing therein, a feed nut carried by said column, a rotatable feed screw carried by said tool slide and engaged in said nut, gearing including spline means connecting said feed screw to the slide feed transfer gearing in said transfer box, gearing including spline means connecting said tool spindle to the tool spindle drive transfer gearing in said transfer box, a slide feed assembly applicable to and removable from said column as a complete unit comprising a feed housing, a feed motor carried by said housing, change speed gearing in said housing connected to said feed motor, a shaft connecting the gearing in said feed housing to the slide feed transfer gearing in said transfer box, a spindle drive assembly applicable to and removable from said column as a complete unit comprising a drive housing, a drive motor carried by said drive housing, change speed gearing in said drive housing connected to said drive motor, and a shaft connecting the gearing in said drive housing to the tool spindle drive transfer gearing in said transfer box.

References Cited by the Examiner

UNITED STATES PATENTS

| | | | |
|---|---|---|---|
| 2,536,413 | 1/51 | Bauer et al. | 90—1 |
| 2,542,569 | 2/51 | Praeg | 90—1.6 |
| 2,581,700 | 1/52 | Praeg | 90—1.6 |
| 2,585,261 | 2/52 | Mentley | 20—1.6 |
| 2,612,080 | 9/52 | Davis | 90—1.6 |
| 2,953,067 | 9/60 | Ufert | 90—1.6 |
| 3,122,968 | 3/64 | Albrecht | 90—1 |

FOREIGN PATENTS

| | | |
|---|---|---|
| 1,115,106 | 10/61 | Germany. |
| 871,184 | 6/61 | Great Britain. |

ANDREW R. JUHASZ, *Primary Examiner.*

LEON PEAR, *Examiner.*